United States Patent
Wang (10) Patent No.: US 11,076,375 B2
(45) Date of Patent: Jul. 27, 2021

(54) DEDICATED BEARER CREATION METHOD, MOBILITY MANAGEMENT ENTITY, AND PACKET DATA NETWORK GATEWAY

(71) Applicant: CHINA ACADEMY OF TELECOMMUNICATIONS TECHNOLOGY, Beijing (CN)

(72) Inventor: Hucheng Wang, Beijing (CN)

(73) Assignee: CHINA ACADEMY OF TELECOMMUNICATIONS TECHNOLOGY, Beijing (CN)

(*) Notice: Subject to any disclaimer, the term of this patent is extended or adjusted under 35 U.S.C. 154(b) by 0 days.

(21) Appl. No.: 16/765,840

(22) PCT Filed: Sep. 10, 2018

(86) PCT No.: PCT/CN2018/104821
§ 371 (c)(1),
(2) Date: May 20, 2020

(87) PCT Pub. No.: WO2019/100813
PCT Pub. Date: May 31, 2019

(65) Prior Publication Data
US 2020/0367190 A1 Nov. 19, 2020

(30) Foreign Application Priority Data
Nov. 21, 2017 (CN) .......................... 201711168078.4

(51) Int. Cl.
*H04W 36/00* (2009.01)
*H04W 60/04* (2009.01)
*H04W 76/38* (2018.01)

(52) U.S. Cl.
CPC ....... *H04W 60/04* (2013.01); *H04W 36/0072* (2013.01); *H04W 36/00837* (2018.08); *H04W 76/38* (2018.02)

(58) Field of Classification Search
CPC ................. H04W 60/04; H04W 76/38; H04W 36/00837; H04W 36/0072; H04W 36/00; H04W 36/14; H04W 88/14; H04W 88/16
(Continued)

(56) References Cited

U.S. PATENT DOCUMENTS

2009/0129342 A1* 5/2009 Hwang ............. H04W 36/0022
370/331
2010/0165940 A1* 7/2010 Watfa ...................... H04W 8/08
370/329
(Continued)

FOREIGN PATENT DOCUMENTS

CN 101478743 A 7/2009
CN 102111745 A 6/2011
(Continued)

OTHER PUBLICATIONS

International Search Report in the international application No. PCT/CN2018/104821, dated Nov. 29, 2018.
(Continued)

*Primary Examiner* — Nathan S Taylor
(74) *Attorney, Agent, or Firm* — Ladas & Parry, LLP (57) ABSTRACT

A dedicated bearer creation method, an MME, and a PDN gateway are provided. The dedicated bearer creation method includes: in a TAU procedure, when it is determined that a UE has moved from a 5G network to a 4G network based on identification information provided by the UE, keeping a control plane NAS connection after the TAU procedure; and when a create dedicated bearer request has been received from a PDN gateway, creating a dedicated bearer for the UE using the NAS connection. According to the present disclosure, it is able to create a radio bearer based on the practical need, and prevent the occurrence of a waste of air interface resources caused when the MME requests an eNB to create a user plane radio bearer in the TAU procedure, thereby to
(Continued)

solve the problem in the related art where the waste of the air interface resources is caused by a dedicated bearer creation scheme.

12 Claims, 7 Drawing Sheets

(58) Field of Classification Search
USPC .................................................. 455/435.1
See application file for complete search history.

(56) References Cited

U.S. PATENT DOCUMENTS

| | | | | |
|---|---|---|---|---|
| 2011/0103277 | A1* | 5/2011 | Watfa | H04W 36/0033 370/310 |
| 2011/0201343 | A1* | 8/2011 | Pinheiro | H04W 88/02 455/450 |
| 2013/0163559 | A1 | 6/2013 | Wang | |
| 2013/0231080 | A1* | 9/2013 | Cheuk | H04M 15/844 455/405 |
| 2014/0016614 | A1* | 1/2014 | Velev | H04W 36/165 370/331 |
| 2014/0219248 | A1* | 8/2014 | Reddiboyana | H04W 76/15 370/331 |
| 2014/0241317 | A1* | 8/2014 | Jamadagni | H04W 40/36 370/331 |
| 2015/0351139 | A1* | 12/2015 | Zhang | H04L 5/0055 370/329 |
| 2016/0112943 | A1 | 4/2016 | Horn et al. | |
| 2017/0048112 | A1* | 2/2017 | Ronneke | H04L 41/12 |
| 2017/0245310 | A1* | 8/2017 | Chandramouli | H04W 8/20 |
| 2017/0272990 | A1* | 9/2017 | Mutikainen | H04W 36/0069 |
| 2018/0020418 | A1* | 1/2018 | Chandramouli | H04W 16/14 |
| 2018/0227807 | A1* | 8/2018 | Youn | H04W 88/16 |
| 2018/0376384 | A1* | 12/2018 | Youn | H04W 8/02 |
| 2019/0014530 | A1* | 1/2019 | Aghili | H04W 28/12 |
| 2019/0037448 | A1* | 1/2019 | Shan | H04W 4/48 |
| 2019/0141758 | A1* | 5/2019 | Trivisonno | H04W 76/12 |
| 2019/0150225 | A1* | 5/2019 | Mohamed | H04W 28/0263 370/329 |
| 2019/0289571 | A1* | 9/2019 | Park | H04W 60/00 |
| 2020/0245110 | A1* | 7/2020 | Kim | H04W 80/08 |
| 2020/0252991 | A1* | 8/2020 | Olsson | H04M 15/66 |
| 2020/0267607 | A1* | 8/2020 | Stojanovski | H04W 36/0055 |

FOREIGN PATENT DOCUMENTS

| | | |
|---|---|---|
| CN | 102281519 A | 12/2011 |
| CN | 103155688 A | 6/2013 |
| CN | 106797554 A | 5/2017 |
| WO | 2013029245 A1 | 3/2013 |

OTHER PUBLICATIONS

Written Opinion of the International Searching Authority in the international application No. PCT/CN2018/104821, dated Nov. 23, 2018 with English translation provided by Google Translate.
3rd Generation Partnership Project, "Technical Specification Group Services and System Aspects; System Architecture for the 5G System; Stage 2 (Release 15)." 3GPP TS 23.501 V1.3.0, Sep. 30, 2017.
3rd Generation Partnership Project, "Technical Specification Group Services and System Aspects; General Packet Radio Service (GPRS) enhancements for Evolved Universal Terrestrial Radio Access Network (E-UTRAN) access (Release 15)" 3GPP TS 23.401 V15.1.0, Sep. 2017.
SA WG2 Meeting #121, S2-173064, "TAU procedure from 5GS to 4G with SR UE using Nx" May 2017.
3rd Generation Partnership Project "Technical Specification Group Services and System Aspects; Procedures for the 5G System; Stage 2 (Release 15)" 3GPP TS 23.502 V1.3.0, Nov. 2017.
First Office Action in Chinese Application No. 201711168078.4, dated Jan. 7, 2020.
Written Opinion of the International Searching Authority in the international application No. PCT/CN2018/104821, dated Nov. 29, 2018 with English translation provided by WIPO.
International Preliminary Report on Patentability issued in the international application No. PCT/CN2018/104821, dated May 26, 2020 with English translation provided by WIPO.
Extended European Search Report from EP app. No. 18880786.1, dated Jan. 26, 2021.
"Clarification of new active flag handling for CP CIoT EPS Optimization", S2-163772, SA EG2 Meeting #116, Vienna, Austria, Jul. 11-15, 2016.
"Single-registration with no Nx", S2-174568, SA WG2 Meeting #122, Cabo, Mexico, Jun. 26-30, 2017.

* cited by examiner

DEDICATED BEARER CREATION METHOD, MOBILITY MANAGEMENT ENTITY, AND PACKET DATA NETWORK GATEWAY

CROSS-REFERENCE TO RELATED APPLICATIONS

This application is the U.S. national phase of PCT Application No. PCT/CN2018/104821 filed on Sep. 10, 2018, which claims a priority to the Chinese patent application No. 201711168078.4 filed on Nov. 21, 2017, the disclosures of which are incorporated herein by reference in their entireties.

TECHNICAL FIELD

The present disclosure relates to the field of communication technology, in particular to a dedicated bearer creation method, a Mobility Management Entity (MME), and a packet data network gateway.

BACKGROUND

As proposed by the $3^{rd}$-Generation Partnership Project (3GPP), in a $5^{th}$-Generation (5G)-to-$4^{th}$-Generation (4G) idle state Tracking Area Update (TAU) procedure, a Packet Data Network Gateway Control Plane and Session Management Function (PGW-C+SMF) may trigger the establishment of a dedicated bearer after the TAU procedure has ended. However, in the existing TAU procedure, an MME may release a Non-Access Stratum (NAS) signaling connection after transmitting a TAU acceptance message. Hence, the 3GPP has proposed a method for ensuring the NAS connection using an active flag. This method requires the MME to always establish an air interface Data Radio Bearer (DRB) during the TAU procedure, no matter whether a dedicated bearer creation process occurs subsequently. This may result in a waste of air interface resources.

Figure 1:
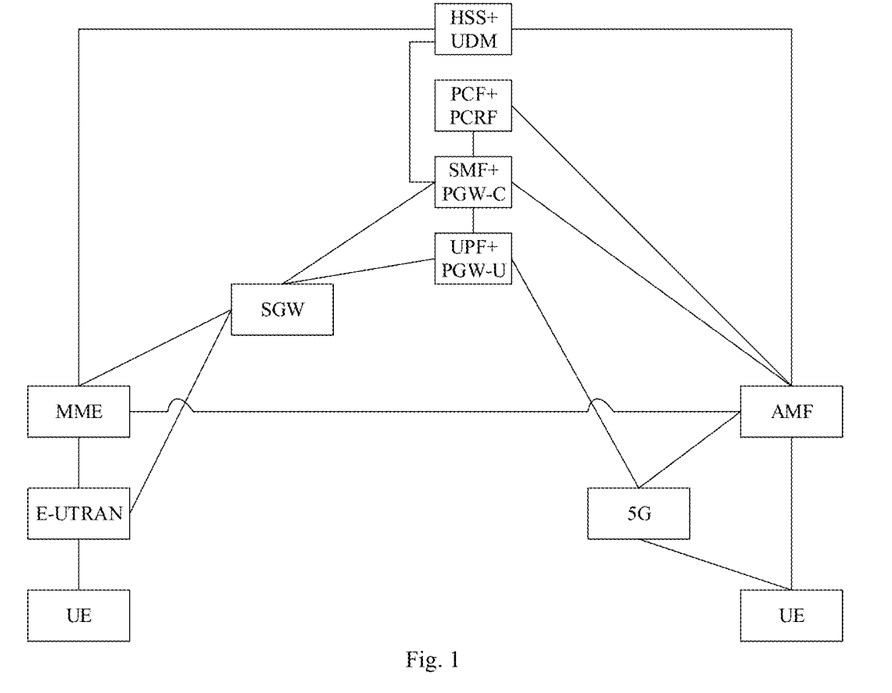
FIG. 1 is a schematic view showing a network architecture in the related art.

FIG. 1 shows a network architecture model that supports interoperability between a 5G network and a Long Term Evolution (LTE) network (a 4G network). In FIG. 1, an N26 interface between the MME and a 5G System (5GS) Access Control and Mobility Management Function (AMF) is optional. When the network supports the N26 interface, the network may support the handover between the 5G network and the LTE network. In this case, context information about a User Equipment (UE), including mobility context and session connection context, needs to be transmitted between the MME and the AMF. When the UE accesses the network that supports the N26 interface, the network may configure a single registration mode for the UE. In FIG. 1, HSS+UDM represents a Home Subscriber Server (HSS)+Unified Data Management (UDM) function; PCF+PCRF represents Policy Control Function (PCF)+Policy and Charging Rule Function (PCRF); UPF+PGW-U represents a User Plane Function (UPF)+PDN gateway User Plane Function (PGW-U); and E-UTRAN represents Evolved Universal Mobile Telecommunications System (UMTS) Terrestrial Radio Access Network.

In the single registration mode, when the UE moves from the 5GS to an Evolved Packet System (EPS) network and the N26 interface is supported between the 5GS and the EPS network, for the UE in a connected state, as described in Technical Specification (TS) 23.502, an inter-Radio Access Technique (RAT) handover process is performed.

Figure 2:
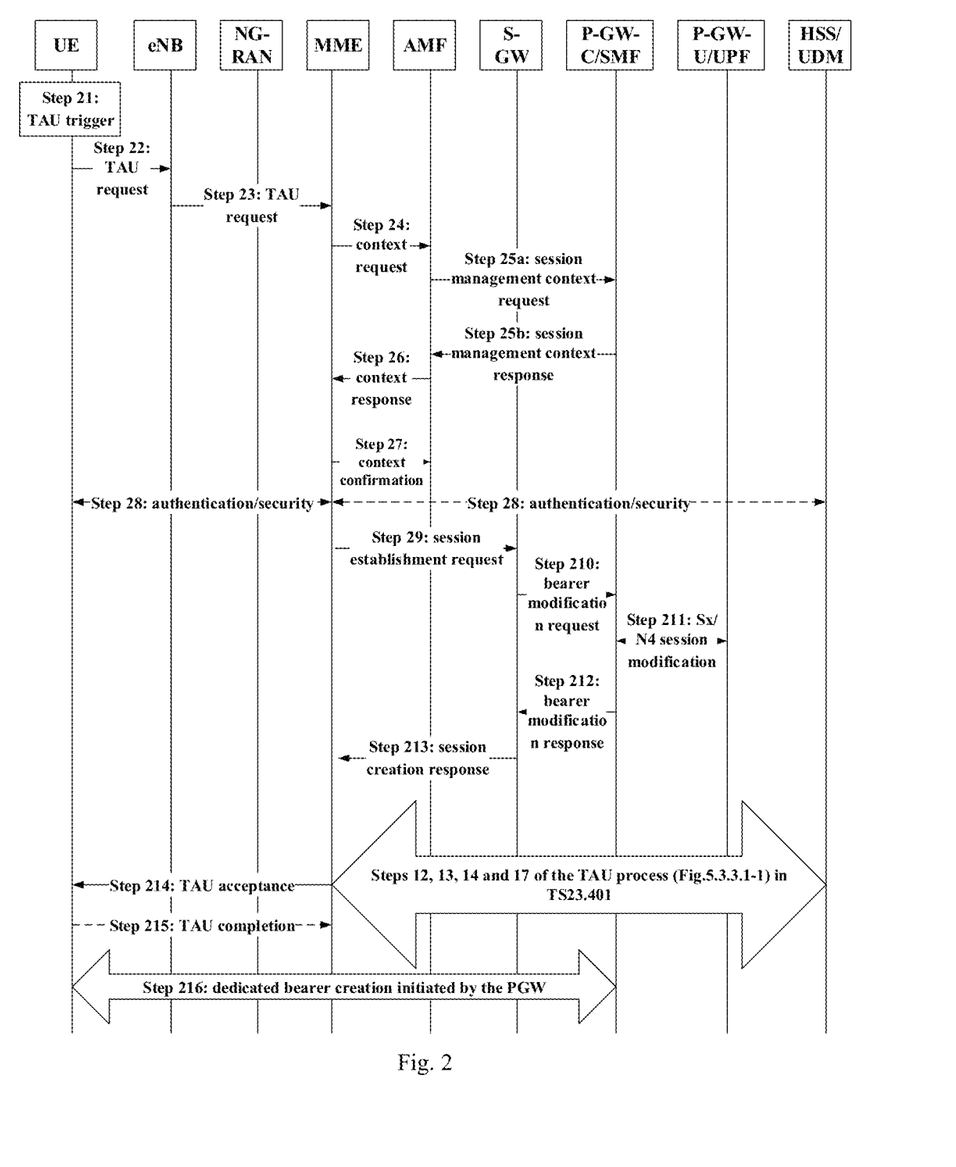
FIG. 2 is a schematic view showing a situation where a UE moves from a 5GS to an EPS network in the related art.

For the UE in an idle state, when the UE moves from a 5G Core network (5GC) to an Evolved Packet Core network (EPC), the UE performs the TAU procedure using a 5G Globally Unique Temporary UE Identity (5G-GUTI, which is acquired from a 4G-GUTI through mapping), and the MME acquires mobility management MM context and session management SM context of the UE from the 5GC through the N26 interface. When the UE moves from the EPC to the 5GC, UE performs a registration process using the 4G-GUTI (which is acquired from the 5G-GUTI through mapping), and the AMF and the SMF obtain the MM context and the SM context of the UE from the EPC. FIG. 2 shows a specific process. In FIG. 2, NG-RAN represents a Next Generation Radio Access Network (NG-RAN), PGW-U+UPF (P-GW-U/UPF) represents PDN gateway User Plane Function (UPF)+User Plane Function (UPF), and HSS+UDM (HSS/UDM) represents a Home Subscriber Server (HSS)+Unified Data Management (UDM) function.

When the active flag is carried in a TAU request message, the MME needs to keep the signaling connection unreleased after Step 215 (otherwise, upon the receipt of a TAU completion message, the MME may initiate an S1 release process to release the NAS signaling connection within a period of time). Thus, in Step 216, upon the receipt of a create dedicated bearer request initiated by the PGW, the MME may initiate the dedicated bearer creation process using the existing NAS signaling connection.

Based on the above, the UE is required to transmit the active flag in the related art, so the MME may request an evolved Node B (eNB) to create a user plane radio bearer in the TAU procedure. When the PGW fails to initiate the dedicated bearer creation process subsequently, the eNB needs to wait for a period of time (controlled by a timer) to initiate a radio bearer release process, resulting in an unnecessary radio bearer setup process and an unnecessary radio bearer deletion process.

SUMMARY

An object of the present disclosure is to provide a dedicated bearer creation method, an MME, and a PDN gateway, so as to solve the problem in the related art where a waste of air interface resources is caused by a dedicated bearer creation scheme.

In one aspect, the present disclosure provides in some embodiments a dedicated bearer creation method for an MME, including: keeping a control plane Non-Access Stratum (NAS) connection after a Tracking Area Update (TAU) procedure if it is determined that a User Equipment (UE) has moved from a 5th-Generation (5G) network to a 4th-Generation (4G) network based on identification information provided by the UE during the TAU procedure; and creating a dedicated bearer for the UE using the NAS connection if a create dedicated bearer request has been received from a Packet Data Network (PDN) gateway.

In a possible embodiment of the present disclosure, the keeping the control plane NAS connection after the TAU procedure includes: keeping the control plane NAS connection within a preset time period after the TAU procedure, the NAS connection consisting of a Radio Resource Control (RRC) connection for an air interface and an S1 connection between a base station and the MME; and when the dedicated create bearer request has not been received from the PDN gateway within the preset time period, releasing the NAS connection of the control plane.

In a possible embodiment of the present disclosure, the creating the dedicated bearer for the UE using the NAS connection when the dedicated create bearer request has been received from the PDN gateway includes, transmitting, when the create dedicated bearer request has been received from the PDN gateway, a request message to create dedicated bearer to the UE using the NAS connection during or after the establishment of a user plane radio bearer for the UE.

In a possible embodiment of the present disclosure, prior to or when transmitting the dedicated create bearer request to the UE using the NAS connection, the dedicated bearer creation method further includes transmitting an initial UE context setup request to the base station connection with the base station, so as to trigger the base station to create the user plane radio bearer for the UE.

In a possible embodiment of the present disclosure, the identification information provided by the UE is a GUTI.

In a possible embodiment of the present disclosure, the creating the dedicated bearer for the UE using the NAS connection when the create dedicated bearer request has been received from the PDN gateway includes, when the dedicated create bearer request has been received from the PDN gateway after the TAU procedure, transmitting the request message to create dedicated bearer to the UE using the kept NAS connection.

In a possible embodiment of the present disclosure, the creating the dedicated bearer for the UE through an existing NAS connection when the dedicated create bearer request has been received from the PDN gateway includes: when a create session response has been received from a serving gateway and the dedicated create bearer request from the PDN gateway is carried in the create session response, parsing the dedicated create bearer request from the create session response; and transmitting the dedicated create bearer request to the UE using the NAS connection based on the dedicated create bearer request.

In another aspect, the present disclosure provides in some embodiments a dedicated bearer creation method for a PDN gateway, including, when it is determined that a UE has moved from a 5G network to a 4G network and it is necessary to initiate a dedicated bearer creation process, transmitting a modify bearer response message carrying a dedicated create bearer request to a serving gateway, so as to trigger the serving gateway to transmit the dedicated create bearer request to an MME through a create session response.

In a possible embodiment of the present disclosure, the transmitting the bearer response modification message carrying the dedicated create bearer request to the serving gateway when it is determined that the UE has moved from the 5G network to the 4G network and it is necessary to initiate the dedicated bearer creation process includes: upon the receipt of a modify bearer request from the serving gateway, determining that the UE has moved from the 5G network to the 4G network and it is necessary to initiate the dedicated bearer creation process; and transmitting the modify bearer response message carrying the dedicated create bearer request to the serving gateway.

In yet another aspect, the present disclosure provides in some embodiments an MME, including a transceiver, a memory, a processor, and a computer program stored in the memory and executed by the processor. The processor is configured to read the computer program stored in the memory so as to: keep a control plane Non-Access Stratum (NAS) connection after a Tracking Area Update (TAU) procedure if it is determined that a User Equipment (UE) has moved from a 5th-Generation (5G) network to a 4th-Generation (4G) network based on identification information provided by the UE during the TAU procedure; and create a dedicated bearer for the UE using the NAS connection if a create dedicated bearer request has been received from a Packet Data Network (PDN) gateway.

In a possible embodiment of the present disclosure, the processor is further configured to: keep the control plane NAS connection within a preset time period after the TAU procedure; and when the dedicated create bearer request has not been received from the PDN gateway within the preset time period, release the control plane NAS connection.

In a possible embodiment of the present disclosure, the processor is further configured to, when the create dedicated bearer request has been received from the PDN gateway, transmit the request message to create dedicated bearer to the UE using the NAS connection while the base station is creating an user plane radio bearer for the UE or after the creation of the user plane radio bearer has completed.

In a possible embodiment of the present disclosure, the processor is further configured to, prior to or when transmitting the dedicated create bearer request to the UE using the NAS connection, transmit an initial UE context setup request to the base station via the S1 connection with the base station, so as to trigger the base station to create the user plane radio bearer for the UE.

In a possible embodiment of the present disclosure, the identification information provided by the UE is a GUTI.

In a possible embodiment of the present disclosure, the processor is further configured to, when the dedicated create bearer request has been received from the PDN gateway after the TAU procedure, transmit the dedicated create bearer request to the UE through the kept NAS connection.

In a possible embodiment of the present disclosure, the processor is further configured to: when a create session response has been received from a serving gateway and the dedicated create bearer request from the PDN gateway is carried in the create session response, parse the dedicated create bearer request from the create session response; and transmit the dedicated create bearer request to the UE using the NAS connection based on the dedicated create bearer request.

In still yet another aspect, the present disclosure provides in some embodiments a PDN gateway, including a transceiver, a memory, a processor, and a computer program stored in the memory and executed by the processor. The processor is configured to read the computer program stored in the memory so as to, when it is determined that a UE has moved from a 5G network to a 4G network and it is necessary to initiate a dedicated bearer creation process, transmit through the transceiver a modify bearer response message carrying a dedicated create bearer request to a serving gateway, so as to trigger the serving gateway to transmit the dedicated create bearer request to an MME through a create session response.

In a possible embodiment of the present disclosure, the processor is further configured to: upon the receipt of a modify bearer request from the serving gateway, determine that the UE has moved from the 5G network to the 4G network and it is necessary to initiate the dedicated bearer creation process; and transmit the modify bearer response message carrying the dedicated create bearer request to the serving gateway.

In still yet another aspect, the present disclosure provides in some embodiments a computer-readable storage medium storing therein a computer program. The computer program is executed by a processor so as to implement the above-mentioned dedicated bearer creation method for the MME.

In still yet another aspect, the present disclosure provides in some embodiments a computer-readable storage medium storing therein a computer program. The computer program is executed by a processor so as to implement the above-mentioned dedicated bearer creation method for the PDN gateway.

In still yet another aspect, the present disclosure further provides in some embodiments a dedicated bearer creation device for an MME, including: a first processing module configured to, keep a control plane Non-Access Stratum (NAS) connection after a Tracking Area Update (TAU) procedure if it is determined that a User Equipment (UE) has moved from a 5$^{th}$-Generation (5G) network to a 4$^{th}$-Generation (4G) network based on identification information provided by the UE during the TAU procedure; and a second processing module configured to, create a dedicated bearer for the UE using the NAS connection if a create dedicated bearer request has been received from a Packet Data Network (PDN) gateway.

In a possible embodiment of the present disclosure, the first processing module includes: a first processing sub-module configured to keep the control plane NAS connection within a preset time period after the TAU procedure; and a second processing sub-module configured to, when the dedicated create bearer request has not been received from the PDN gateway within the preset time period, release the control plane NAS connection.

In a possible embodiment of the present disclosure, the second processing module includes: a first transmission sub-module configured to, when the create dedicated bearer request has been received from the PDN gateway, transmit the request message to create dedicated bearer to the UE using the NAS connection while the base station is creating an user plane radio bearer for the UE or after the creation of the user plane radio bearer has completed.

In a possible embodiment of the present disclosure, the dedicated bearer creation device further includes: a first transmission module configured to, prior to or when transmitting the dedicated create bearer request to the UE using the NAS connection, transmit an initial UE context setup request to the base station via the S1 connection with the base station, so as to trigger the base station to create the user plane radio bearer for the UE.

In a possible embodiment of the present disclosure, the identification information provided by the UE is a GUTI.

In a possible embodiment of the present disclosure, the second processing module includes a third processing sub-module configured to, when the dedicated create bearer request has been received from the PDN gateway after the TAU procedure, transmit the dedicated create bearer request to the UE through the kept NAS connection.

In a possible embodiment of the present disclosure, the second processing module includes: a fourth processing sub-module configured to, when a create session response has been received from a serving gateway and the dedicated create bearer request from the PDN gateway is carried in the create session response, parse the dedicated create bearer request from the create session response; and a fifth processing sub-module configured to transmit the dedicated create bearer request to the UE using the NAS connection based on the dedicated create bearer request.

In still yet another aspect, the present disclosure provides in some embodiments a dedicated bearer creation device for a PDN gateway, including a third processing module configured to, when it is determined that a UE has moved from a 5G network to a 4G network and it is necessary to initiate a dedicated bearer creation process, transmit a modify bearer response message carrying a dedicated create bearer request to a serving gateway, so as to trigger the serving gateway to transmit the dedicated create bearer request to an MME through a create session response.

In a possible embodiment of the present disclosure, the third processing module includes: a sixth processing sub-module configured to, upon the receipt of a modify bearer request from the serving gateway, determine that the UE has moved from the 5G network to the 4G network and it is necessary to initiate the dedicated bearer creation process; and a seventh processing sub-module configured to transmit the modify bearer response message carrying the dedicated create bearer request to the serving gateway.

The present disclosure has the following beneficial effects.

According to the embodiments of the present disclosure, in the TAU procedure, when it is determined that the UE has moved from the 5G network to the 4G network based on the identification information provided by the UE, the control plane NAS connection may be kept after the TAU procedure, and when the dedicated create bearer request has been received from the PDN gateway, the dedicated bearer may be created for the UE using the NAS connection. As a result, it is able to create the air interface bear according to the practical need, and prevent the occurrence of a waste of air interface resources caused when the MME requests the eNB to create the user plane radio bearer in the TAU procedure, thereby to solve the problem in the related art where the waste of the air interface resources is caused by the dedicated bearer creation scheme.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Figure 3:
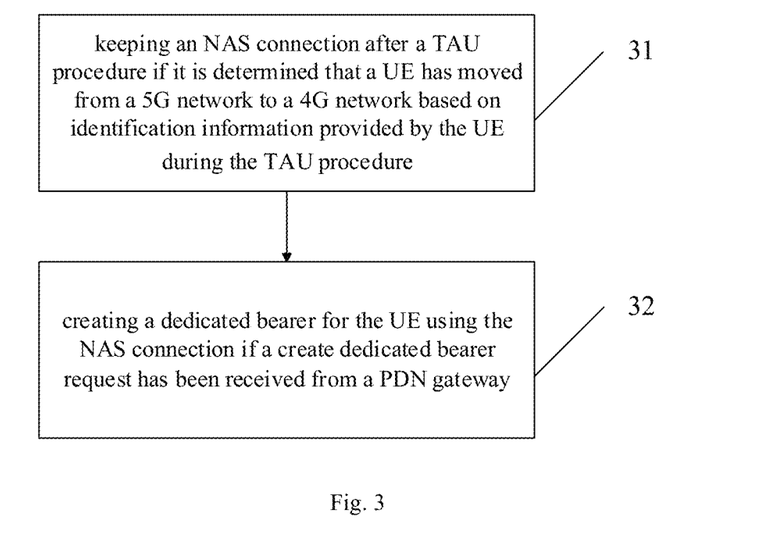
FIG. 3 is a flow chart of a dedicated bearer creation method according to one embodiment of the present disclosure.

In order to solve the problem in the related art where a waste of air interface resources is caused by a dedicated bearer creation scheme, the present disclosure provides in some embodiments a dedicated bearer creation method for an MME which, as shown in FIG. 3, includes: Step 31 of, in a TAU procedure, when it is determined that a UE has moved from a 5G network to a 4G network based on identification information provided by the UE, keeping a control plane NAS connection after the TAU procedure; and Step 32 of, creating a dedicated bearer for the UE using the NAS connection if a create dedicated bearer request has been received from a PDN gateway.

According to the embodiments of the present disclosure, in the TAU procedure, when it is determined that the UE has moved from the 5G network to the 4G network based on the identification information provided by the UE, the control plane NAS connection may be kept after the TAU procedure, and when the create dedicated bearer request has been received from the PDN gateway, the dedicated bearer may be created for the UE using the NAS connection. As a result, it is able to create the radio bear according to the practical need, and prevent the occurrence of a waste of air interface resources caused when the MME requests the eNB to create the user plane radio bearer in the TAU procedure, thereby to solve the problem in the related art where the waste of the air interface resources is caused by the dedicated bearer creation scheme.

In a possible embodiment of the present disclosure, the keeping the control plane NAS connection after the TAU procedure may include: keeping the control plane NAS connection within a preset time period after the TAU procedure, the NAS connection consisting of an RRC connection for an air interface and an S1 connection between a base station and the MME; and when the create dedicated bearer request has not been received from the PDN gateway within the preset time period, releasing the control plane NAS.

In a possible embodiment of the present disclosure, the preset time period may be longer than a duration for the UE to trigger the local release of the NAS connection.

To be specific, the creating the dedicated bearer for the UE using the NAS connection when the create dedicated bearer request has been received from the PDN gateway may include, when the create dedicated bearer request has been received from the PDN gateway, transmitting request message to create dedicated bearer (i.e., an ACTIVATE DEDICATED EPS BEARER CONTEXT REQUEST message) to the UE using the NAS connection during or after the establishment of an user plane radio bearer for the UE.

Further, prior to or when transmitting the create dedicated bearer request to the UE using the NAS connection, the dedicated bearer creation method may further include transmitting an initial UE context setup request to the base station via the S1 connection with the base station, so as to trigger the base station to create the user plane radio bearer for the UE.

In a possible embodiment of the present disclosure, the identification information provided by the UE may be a GUTI.

Step 32 may be implemented in one of the following two modes.

In a first mode, the creating the dedicated bearer for the UE using the NAS connection when the create dedicated bearer request has been received from the PDN gateway may include, when the create dedicated bearer request has been received from the PDN gateway after the TAU procedure, transmitting the request message to create dedicated bearer to the UE through the kept NAS connection.

In a second mode, the creating the dedicated bearer for the UE using an existing NAS connection when the create dedicated bearer request has been received from the PDN gateway may include: when a create session response has been received from a serving gateway and the create dedicated bearer request from the PDN gateway is carried in the create session response, parsing the create dedicated bearer request from the create session response; and transmitting the request message to create dedicated bearer to the UE using the NAS connection based on the create dedicated bearer request.

The receiving the create session response from the serving gateway may include receiving the create dedicated bearer request carried in the create session response from the serving gateway based on a modify bearer response carrying the create dedicated bearer request from a PGW.

Further, the dedicated bearer creation method may further include, when no create dedicated bearer request from the PGW is carried in the create session response, releasing the existing NAS connection.

Figure 4:
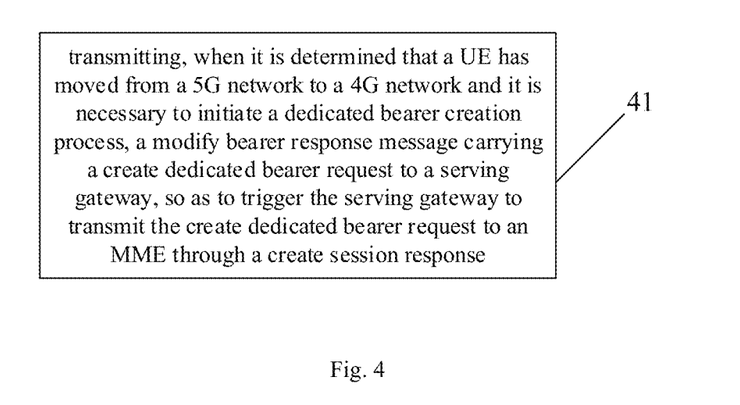
FIG. 4 is a flow chart of a dedicated bearer creation method according to one embodiment of the present disclosure.

The present disclosure further provides in some embodiments a dedicated bearer creation method for a PDN gateway which, as shown in FIG. 4, includes Step 41 of, when it is determined that a UE has moved from a 5G network to a 4G network and it is necessary to initiate a dedicated bearer creation process, transmitting a modify bearer response message carrying a create dedicated bearer request to a serving gateway, so as to trigger the serving gateway to transmit the create dedicated bearer request to an MME through a create session response.

According to the dedicated bearer creation method in the embodiments of the present disclosure, when it is determined that the UE has moved from the 5G network to the 4G network and it is necessary to initiate the dedicated bearer creation process, the modify bearer response message carrying the create dedicated bearer request may be transmitted to the serving gateway, so as to trigger the serving gateway to transmit the create dedicated bearer request to the MME through the create session response. Then, the MME may receive the create dedicated bearer request from the PDN gateway before the TAU procedure, and create the dedicated bearer for the UE through the existing NAS connection. As a result, it is able to create the radio bear according to the practical need, and prevent the occurrence of a waste of air interface resources caused when the MME requests the eNB to create the user plane radio bearer in the TAU procedure, thereby to solve the problem in the related art where the waste of the air interface resources is caused by the dedicated bearer creation scheme.

To be specific, the transmitting the bearer response modification message carrying the create dedicated bearer request to the serving gateway when it is determined that the UE has moved from the 5G network to the 4G network and it is necessary to initiate the dedicated bearer creation process may include: upon the receipt of a modify bearer request from the serving gateway, determining that the UE has moved from the 5G network to the 4G network and it is necessary to initiate the dedicated bearer creation process; and transmitting the modify bearer response message carrying the create dedicated bearer request to the serving gateway.

The dedicated bearer creation method will be described hereinafter in conjunction with the MME and the PDN gateway.

Figure 5:
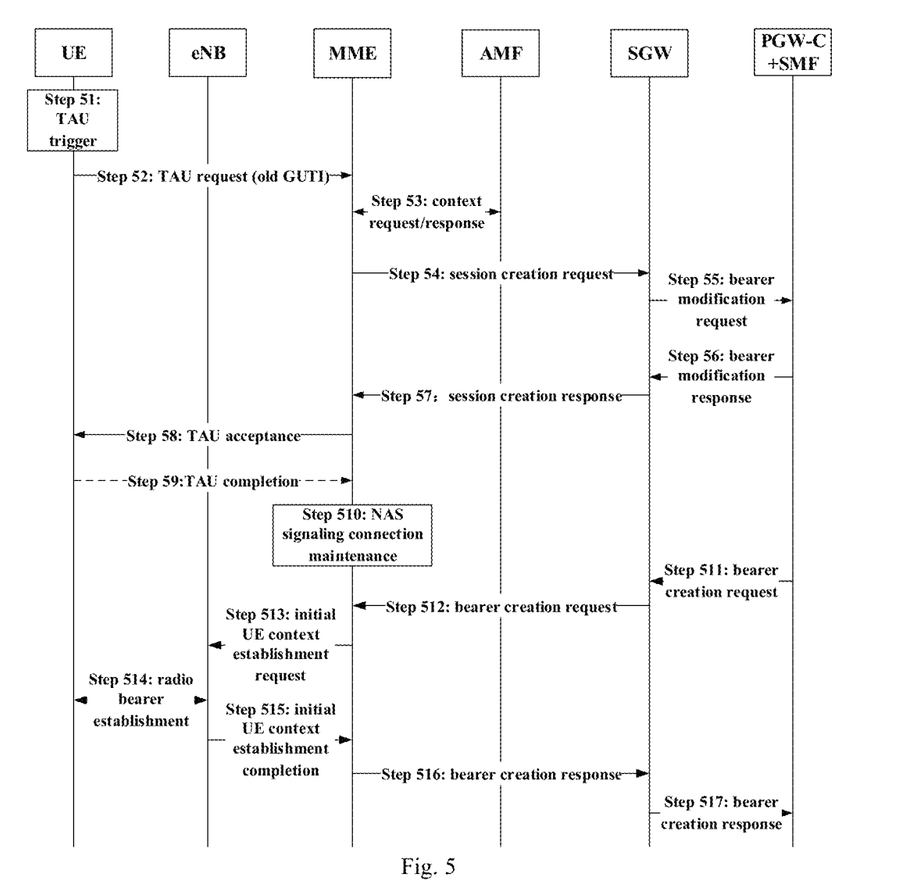
FIG. 5 is a schematic view showing the dedicated bearer creation method according to one embodiment of the present disclosure.

In order to solve the above problem, the present disclosure provides in some embodiments a dedicated bearer creation method in the following two implementation modes. In a first implementation mode, the dedicated bearer creation method is mainly performed by the MME, and it may generally include: keeping, by the MME, the NAS signaling connection when it is determined that the UE has moved from the 5G network to the 4G network (based on a GUTI type); and upon the receipt of the create dedicated bearer request from the PGW, transmitting, by the MME, the initial UE contest setup message to the eNB, so as to request the eNB to establish a user plane bearer for the UE. The MME may continue to perform the dedicated bearer creation process. To be specific, whether the NAS connection is to be kept may be determined based on the GUTI. As shown in FIG. 5, the dedicated bearer creation method may include the following steps.

Step 51: the UE may initiate a TAU trigger.

Step 52: the UE may transmit a TAU request (carrying an old GUTI) to the MME.

Figure 11:
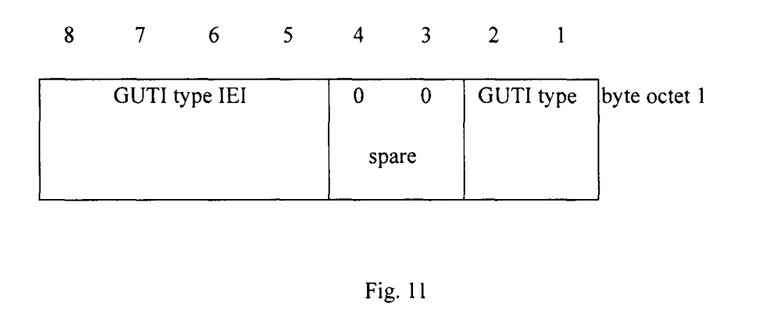
FIG. 11 is a schematic view showing a mapping message according to one embodiment of the present disclosure.

Steps 51-52: after the UE has moved from the 5G network to the 4G network, the UE may initiate a TAU procedure, and the 4G GUTI acquired from the 5G GUTI through mapping, i.e., the old GUTI (the mapped GUTI), may be carried in a message. In addition, the UE may indicate in a GUTI type that the GUTI is acquired from the 5G GUTI through a mapping message as shown in FIG. 11. In FIG. 11, IEI represents an information element identifier, and "spare" represents a reserved value.

In the GUTI type, 00 and 01 may have meanings known in the art, and 10 represents that the GUTI is acquired from the 5G GUTI through mapping.

Step 53: the MME may exchange a context request/response with the AMF.

Step 54: the MME may transmit a create session request to the Serving Gateway (SGW).

Step 55: the SGW may transmit a modify bearer request to the PGW-C+SMF.

Step 56: the PGW-C+SMF may return a modify bearer response to the SGW.

Step 57: the SGW may return a create session response to the MME.

Steps 53-57: the MME may acquire the UE context from the AMF, and then update a PDN connection of the UE to the PGW-C+SMF based on the UE context.

Step 58: the MME may transmit a TAU acceptance message to the UE.

Step 59: the UE may return a TAU complete message to the MME.

Step 510: the MME may perform Keep NAS signaling connection;

Steps 58-510: after the MME has transmitted the TAU acceptance message to the UE or after the MME has received the TAU complete message, because the MME has determined that the UE moves from the 5G network to the 4G network, the UE may be kept in the connected state, i.e., the NAS connection of the UE (and the connection between the UE and the S1 interface of the eNB) may be kept within a sufficiently-long time period. This time period should be longer than a duration for the UE to locally release the NAS signaling connection (in the related art, the duration for the UE to trigger the local release of the NAS signaling connection is 10 seconds).

Step 511: the PGW-C+SMF may transmit the create bearer request to the SGW.

Step 512: the SGW may forward the create bearer request to the MME.

Steps 511-512: upon the receipt of the modify bearer request from the SGW in Step 55, the PGW-C may trigger the dedicated bearer creation process, so after transmitting the modify bearer response, the PGW-C may transmit the create bearer request to the SGW to initiate the dedicated bearer creation process.

Step 513: the MME may transmit an initial UE context setup request to the eNB.

Upon the receipt of the create bearer request, the MME may transmit the initial UE context setup request to the eNB through the existing S1 connection, so as to trigger the eNB to create the UE context and the air interface DRB. The MME may also request the eNB to establish the dedicated bearer requested by the PGW in the initial UE Context setup request, or may transmit a create bearer request to the eNB after an initial UE context setup process has completed, so as to create the dedicated bearer.

Further, the MME may transmit the dedicated create bearer request to the UE using the NAS connection while the eNB is creating the user plane radio bearer for the UE or after the eNB has created the user plane radio bearer for the UE, and the terminal may return a response.

Step 514: a radio bearer establishment may be implemented between the UE and the eNB.

Step 515: the eNB may return an initial UE context setup completion message to the MME.

Step 516: the MME may transmit a create bearer response to the SGW.

Step 517: the SGW may forward the create bearer response to the PGW-C+SMF.

Steps 514-517: the eNB may create a radio bearer based on the request from the MME, and then return a response to the MME. MME may return a response to the PGW-C+SMF. Subsequently, the UE may be in the connected state.

Figure 6:
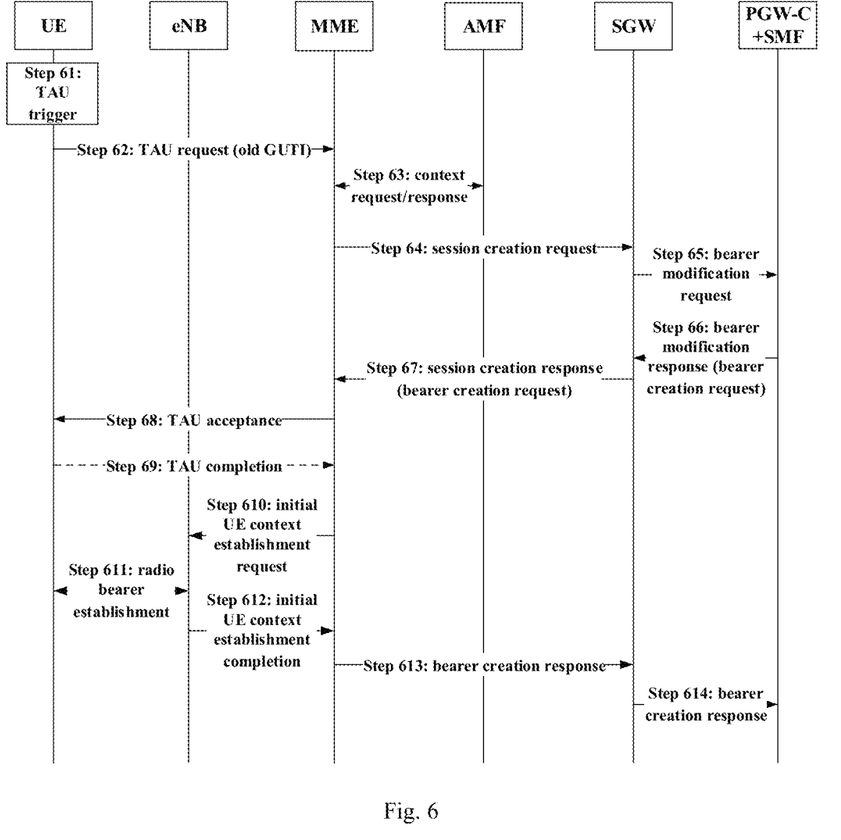
FIG. 6 is a schematic view showing the dedicated bearer creation method according to one embodiment of the present disclosure.

In a second implementation mode, the dedicated bearer creation method is mainly performed by the PGW. When it is determined that the UE has moved from the 5G network to the 4G network and it is necessary to create the dedicated bearer, the create bearer request may be carried in the modify bearer response, so that the MME may simultaneously receive the modify bearer response and the create bearer request, and then synchronously perform the TAU procedure and the initial UE context setup process. In addition, the PGW may transmit the TAU acceptance message to the UE to complete the TAU procedure, and then initiate the initial UE context setup process, as shown in FIG. 6.

Step 61: the UE may initiate a TAU trigger.

Step 62: the UE may transmit a TAU request (carrying the Old GUTI) to the MME.

Steps 61-62: the MME may receive the TAU request from the UE, with reference to Steps 51 to 52.

Step 63: the MME may exchange the context request/response with the AMF.

Step 64: the MME may transmit the create session request to the SGW.

Step 65: the SGW may transmit the modify bearer request to the PGW-C+SMF.

Step 66: the PGW-C+SMF may return the modify bearer response carrying the create bearer request to the SGW.

Step 67: the SGW may return the create session response carrying the create bearer request to the MME.

Steps 63-67: the MME may acquire the UE context from the AMF, and then update the PDN connection of the UE to the PGW-C+SMF based on the UE context.

Steps 66-67: upon the receipt of the modify bearer request from the SGW, the PGW-C may trigger the dedicated bearer establishment process, so the create bearer request for the creation of the dedicated bearer may be carried in the modify bearer response on the basis of a piggyback mechanism in a GTPv2 protocol during the transmission of the modify bearer response, so that the MME may receive the modify bearer response and the create bearer request simultaneously.

Step 68: the MME may transmit the TAU acceptance message to the UE.

Step 69: the UE may return the TAU completion message to the MME.

Steps 68-69: upon the receipt of the create bearer request, the MME may perform the TAU procedure and the initial UE context setup process synchronously. In addition, the MME may transmit the TAU acceptance message to the UE to complete the TAU procedure, and then initiate the initial UE context setup process.

Step 610: the MME may transmit the initial UE context setup request to the eNB.

The MME may transmit the initial UE context setup request to the eNB through the existing S1 connection to trigger the eNB to create the UE context and the air interface DRB. The MME may also request the eNB to establish the dedicated bearer requested by the PGW in the initial UE context setup request, or may transmit the create bearer request to the eNB after the completion of the initial UE context setup process so as to create the dedicated bearer.

Further, the MME may transmit the request message to create dedicated bearer to the UE using the NAS connection while the eNB is creating the user plane radio bearer for the UE or after the eNB has created the user plane radio bearer for the UE, and the UE may return a response.

Step 611: the radio bearer establishment may be implemented between the UE and the eNB.

Step 612: the eNB may return the initial UE context setup completion message to the MME.

Step 613: the MME may transmit the create bearer response to the SGW.

Step 614: the SGW may forward the create bearer response to the PGW-C+SMF.

Steps 611-614: the eNB may create the radio bearer based on the request from the MME, and then return a response to the MME. MME may return a response to the PGW-C+SMF. Subsequently, the UE may be in the connected state.

Based on the above, the first implementation mode of the dedicated bearer creation method mainly includes: (1) when it is determined that the UE has moved from the 5G network to the 4G network, the MME may keep the established NAS connection after the completion of the TAU procedure, and upon the receipt of the create dedicated bearer request from the PGW-C+SMF, the MME may complete the dedicated bearer establishment process through the existing NAS connection; (2) the MME may determine that the UE has moved from the 5G network to the 4G network in the TAU procedure based on the GUTI type or an explicit indication; (3) after the completion of the TAU procedure, including after the transmission of the TAU acceptance message or the reception of the TAU completion message, the MME may keep the established NAS connection; (4) the create dedicated bearer request may be received from the PGW-C+SMF upon the receipt of the create session response; (5) when no create dedicated bearer request has been received after the established NAS connection has been kept for a certain time period, the MME may release the NAS connection.

The second implementation mode of the dedicated bearer creation method mainly includes: (1) the MME may parse the create session response so as to acquire the create dedicated bearer request from the PGW-C+SMF; and (2) the create bearer request is packaged by the PGW-C+SMF in the modify bearer response, and then forwarded by the SGW to the MME through the create session response.

Obviously, according to the embodiments of the present disclosure, it is able to avoid unnecessarily creating and deleting the radio bearer in the TAU procedure from the 5G network to the 4G network.

The present disclosure further provides in some embodiments an MME, including transceiver, a memory, a processor, and a computer program stored in the memory and executed by the processor. The processor is configured to read the computer program stored in the memory so as to: in a TAU procedure, when it is determined that a UE has moved from a 5G network to a 4G network based on identification information provided by the UE, keep an NAS connection of a control plane after the TAU procedure; and when a create dedicated bearer request has been received through the transceiver from a PDN gateway, create a dedicated bearer for the UE using the NAS connection.

According to the MME in the embodiments of the present disclosure, in the TAU procedure, when it is determined that the UE has moved from the 5G network to the 4G network based on the identification information provided by the UE, the control plane NAS connection may be kept after the TAU procedure, and when the create dedicated bearer request has been received from the PDN gateway, the dedicated bearer may be created for the UE using the NAS connection. As a result, it is able to create the air interface bear according to the practical need, and prevent the occurrence of a waste of air interface resources caused when the MME requests the eNB to create the user plane radio bearer in the TAU procedure, thereby to solve the problem in the related art where the waste of the air interface resources is caused by the dedicated bearer creation scheme.

Figure 7:
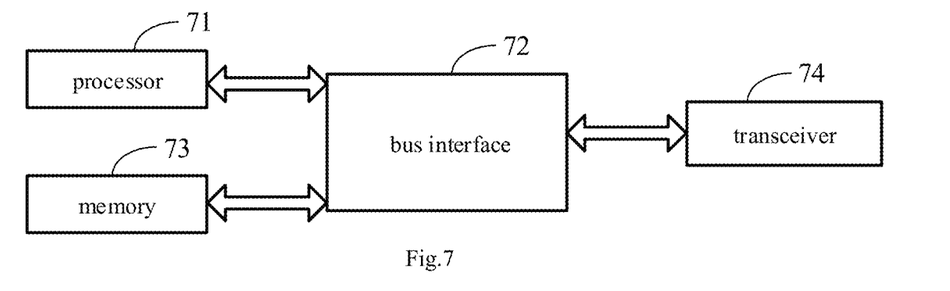
FIG. 7 is a schematic view of an MME according to one embodiment of the present disclosure.

To be specific, as shown in FIG. 7, the MME includes a processor 71, and a memory 73 connected to the processor 71 through a bus interface 72 and configured to store therein programs and data for the operation of the processor 71. The processor 71 is configured to call and execute the programs and data stored in the memory 73, so as to: in a TAU procedure, when it is determined that a UE has moved from a 5G network to a 4G network based on identification information provided by the UE, keep an NAS connection of a control plane after the TAU procedure; and when a create dedicated bearer request has been received through a transceiver 74 from a PDN gateway, create a dedicated bearer for the UE using the NAS connection.

The transceiver 74 is connected to the bus interface 72 and configured to receive and transmit data under the control of the processor 71.

It should be noted that, in FIG. 7, bus architecture may include a number of buses and bridges connected to each other, so as to connect various circuits for one or more processors 71 and one or more memories 73. In addition, as is known in the art, the bus architecture may be used to connect any other circuits, such as a circuit for a peripheral device, a circuit for a voltage stabilizer and a power management circuit. The bus interface may be provided, and the transceiver 74 may consist of a plurality of elements, i.e., a transmitter and a receiver for communication with any other devices over a transmission medium. The processor 71 may take charge of managing the bus architecture as well as general processing. The memory 73 may store therein data for the operation of the processor 71.

It should be further appreciated that, all or parts of the steps may be implemented through hardware, or implemented through relevant hardware indicated by the computer program. The computer program may include instructions for executing all or parts of the steps. In addition, the computer program may be stored in a computer-readable storage medium in any form.

The processor is further configured to: keep the control plane NAS connection within a preset time period after the TAU procedure; and when the create dedicated bearer request has not been received from the PDN gateway within the preset time period, release the control plane NAS connection.

To be specific, the processor is further configured to, when the create dedicated bearer request has been received from the PDN gateway, transmit the request message to create dedicated bearer to the UE using the NAS connection while the base station is creating an user plane radio bearer for the UE or after the creation of the user plane radio bearer has completed.

Further, the processor is further configured to, prior to or when transmitting the request message to create dedicated bearer to the UE using the NAS connection, transmit an initial UE context setup request to the base station via the S1 connection with the base station, so as to trigger the base station to create the user plane radio bearer for the UE.

In a possible embodiment of the present disclosure, the identification information provided by the UE is a GUTI.

When the create dedicated bearer request has been received through the transceiver through the PDN gateway, the dedicated bearer may be created for the UE using the NAS connection in the following two implementation modes.

In a first implementation mode, the processor is further configured to, when the create dedicated bearer request has been received from the PDN gateway after the TAU procedure, transmit the request message to create dedicated bearer to the UE through the kept NAS connection.

In a second implementation mode, the processor is further configured to: when a create session response has been received from a serving gateway and the create dedicated bearer request from the PDN gateway is carried in the create session response, parse the create dedicated bearer request from the create session response; and transmit the request message to create dedicated bearer to the UE using the NAS connection based on the create dedicated bearer request.

The implementation of the MME may refer to that of the dedicated bearer creation method for the MME mentioned hereinabove, with a same technical effect.

The present disclosure further provides in some embodiments a PDN gateway, including a transceiver, a memory, a processor, and a computer program stored in the memory and executed by the processor. The processor is configured to read the computer program stored in the memory so as to, when it is determined that a UE has moved from a 5G network to a 4G network and it is necessary to initiate a dedicated bearer creation process, transmit through the transceiver a modify bearer response message carrying a create dedicated bearer request to a serving gateway, so as to trigger the serving gateway to transmit the create dedicated bearer request to an MME through a create session response.

According to the PDN gateway in the embodiments of the present disclosure, when it is determined that the UE has moved from the 5G network to the 4G network and it is necessary to initiate the dedicated bearer creation process, the modify bearer response message carrying the create dedicated bearer request may be transmitted to the serving gateway, so as to trigger the serving gateway to transmit the create dedicated bearer request to the MME through the create session response. Then, the MME may receive the create dedicated bearer request from the PDN gateway before the TAU procedure, and create the dedicated bearer for the UE through the existing NAS connection. As a result, it is able to create the air interface bear according to the practical need, and prevent the occurrence of a waste of air interface resources caused when the MME requests the eNB to create the user plane radio bearer in the TAU procedure, thereby to solve the problem in the related art where the waste of the air interface resources is caused by the dedicated bearer creation scheme.

Figure 8:
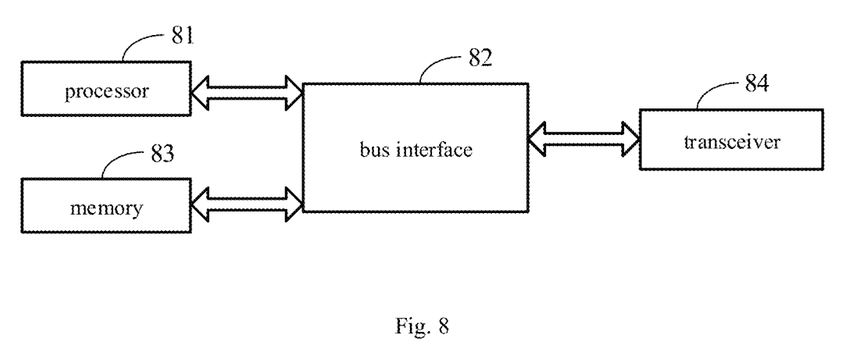
FIG. 8 is a schematic view of a PDN gateway according to one embodiment of the present disclosure.

To be specific, as shown in FIG. 8, the PDN gateway includes a processor 81, and a memory 83 connected to the processor 81 through a bus interface 82 and configured to store programs and data for the operation of the processor 81. The processor 81 is configured to call and execute the programs and data stored in the memory 83, so as to: when it is determined that a UE has moved from a 5G network to a 4G network and it is necessary to initiate a dedicated bearer creation process, transmit through a transceiver 84 a modify bearer response message carrying a create dedicated bearer request to a serving gateway, so as to trigger the serving gateway to transmit the create dedicated bearer request to an MME through a create session response.

The transceiver 84 is connected to the bus interface 82 and configured to receive and transmit data under the control of the processor 81.

It should be noted that, in FIG. 8, bus architecture may include a number of buses and bridges connected to each other, so as to connect various circuits for one or more processors 81 and one or more memories 83. In addition, as is known in the art, the bus architecture may be used to connect any other circuits, such as a circuit for a peripheral device, a circuit for a voltage stabilizer and a power management circuit. The bus interface may be provided, and the transceiver 84 may consist of a plurality of elements, i.e., a transmitter and a receiver for communication with any other devices over a transmission medium. The processor 81 may take charge of managing the bus architecture as well as general processing. The memory 83 may store therein data for the operation of the processor 81.

It should be further appreciated that, all or parts of the steps may be implemented through hardware, or implemented through relevant hardware indicated by the computer program. The computer program may include instructions for executing all or parts of the steps. In addition, the computer program may be stored in a computer-readable storage medium in any form.

To be specific, the processor is further configured to: upon the receipt of a modify bearer request from the serving gateway through the transceiver, determine that the UE has moved from the 5G network to the 4G network and it is necessary to initiate the dedicated bearer creation process;

and transmit the modify bearer response message carrying the create dedicated bearer request to the serving gateway.

The implementation of the PDN gateway may refer to that of the dedicated bearer creation method for the PDN gateway mentioned hereinabove, with a same technical effect.

The present disclosure provides in some embodiments a computer-readable storage medium storing therein a computer program. The computer program is executed by a processor so as to implement the above-mentioned dedicated bearer creation method for the MME.

The implementation of the computer-readable storage medium may refer to that of the dedicated bearer creation method for the MME mentioned hereinabove, with a same technical effect.

The present disclosure further provides in some embodiments a computer-readable storage medium storing therein a computer program. The computer program is executed by a processor so as to implement the above-mentioned dedicated bearer creation method for the PDN gateway.

The implementation of the computer-readable storage medium may refer to that of the dedicated bearer creation method for the PDN gateway mentioned hereinabove, with a same technical effect.

Figure 9:
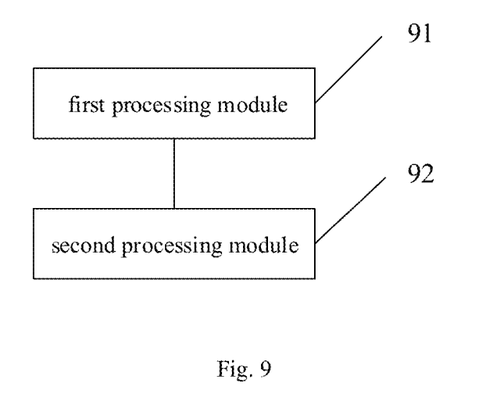
FIG. 9 is a schematic view of a dedicated bearer creation device according to one embodiment of the present disclosure.

The present disclosure further provides in some embodiments a dedicated bearer creation device for an MME which, as shown in FIG. 9, includes: a first processing module 91 configured to, in a TAU procedure, when it is determined that a UE has moved from a 5G network to a 4G network based on identification information provided by the UE, keep an NAS connection of a control plane after the TAU procedure; and a second processing module 92 configured to, when a create dedicated bearer request has been received from a PDN gateway, create a dedicated bearer for the UE using the NAS connection.

According to the dedicated bearer creation device in the embodiments of the present disclosure, in the TAU procedure, when it is determined that the UE has moved from the 5G network to the 4G network based on the identification information provided by the UE, the control plane NAS connection may be kept after the TAU procedure, and when the create dedicated bearer request has been received from the PDN gateway, the dedicated bearer may be created for the UE using the NAS connection. As a result, it is able to create the air interface bear according to the practical need, and prevent the occurrence of a waste of air interface resources caused when the MME requests the eNB to create the user plane radio bearer in the TAU procedure, thereby to solve the problem in the related art where the waste of the air interface resources is caused by the dedicated bearer creation scheme.

In a possible embodiment of the present disclosure, the first processing module may include: a first processing sub-module configured to keep the control plane NAS connection within a preset time period after the TAU procedure; and a second processing sub-module configured to, when the create dedicated bearer request has not been received from the PDN gateway within the preset time period, release the control plane NAS connection.

In a possible embodiment of the present disclosure, the second processing module may include: a first transmission sub-module configured to, when the create dedicated bearer request has been received from the PDN gateway, transmit the request message to create dedicated bearer to the UE using the NAS connection while the base station is creating an user plane radio bearer for the UE or after the creation of the user plane radio bearer has completed.

In a possible embodiment of the present disclosure, the dedicated bearer creation device may further include: a first transmission module configured to, prior to or when transmitting the request message to create dedicated bearer to the UE using the NAS connection, transmit an initial UE context setup request to the base station via the S1 connection with the base station, so as to trigger the base station to create the user plane radio bearer for the UE.

In a possible embodiment of the present disclosure, the identification information provided by the UE may be a GUTI.

The second processing module may be implemented in the following two modes.

In a first mode, the second processing module may include a third processing sub-module configured to, when the create dedicated bearer request has been received from the PDN gateway after the TAU procedure, transmit the request message to create dedicated bearer to the UE through the kept NAS connection.

In a second mode, the second processing module may include: a fourth processing sub-module configured to, when a create session response has been received from a serving gateway and the create dedicated bearer request from the PDN gateway is carried in the create session response, parse the create dedicated bearer request from the create session response; and a fifth processing sub-module configured to transmit the request message to create dedicated bearer to the UE using the NAS connection based on the create dedicated bearer request.

The implementation of the dedicated bearer creation device may refer to that of the dedicated bearer creation method for the MME mentioned hereinabove, with a same technical effect.

Figure 10:
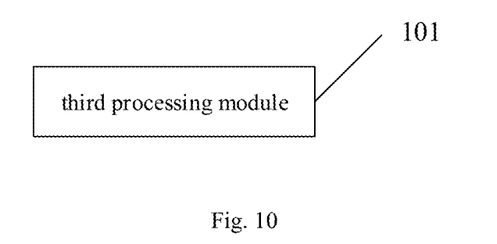
FIG. 10 is a schematic view showing a dedicated bearer creation device according to one embodiment of the present disclosure.

The present disclosure further provides a dedicated bearer creation device for a PDN gateway which, as shown in FIG. 10, includes a third processing module 101 configured to, when it is determined that a UE has moved from a 5G network to a 4G network and it is necessary to initiate a dedicated bearer creation process, transmit a modify bearer response message carrying a create dedicated bearer request to a serving gateway, so as to trigger the serving gateway to transmit the create dedicated bearer request to an MME through a create session response.

According to the dedicated bearer creation device in the embodiments of the present disclosure, when it is determined that the UE has moved from the 5G network to the 4G network and it is necessary to initiate the dedicated bearer creation process, the modify bearer response message carrying the create dedicated bearer request may be transmitted to the serving gateway, so as to trigger the serving gateway to transmit the create dedicated bearer request to the MME through the create session response. Then, the MME may receive the create dedicated bearer request from the PDN gateway before the TAU procedure, and create the dedicated bearer for the UE through the existing NAS connection. As a result, it is able to create the air interface bear according to the practical need, and prevent the occurrence of a waste of air interface resources caused when the MME requests the eNB to create the user plane radio bearer in the TAU procedure, thereby to solve the problem in the related art where the waste of the air interface resources is caused by the dedicated bearer creation scheme.

To be specific, the third processing module may include: a sixth processing sub-module configured to, upon the receipt of a modify bearer request from the serving gateway, determine that the UE has moved from the 5G network to the 4G network and it is necessary to initiate the dedicated bearer creation process; and a seventh processing submodule configured to transmit the modify bearer response message carrying the create dedicated bearer request to the serving gateway.

The implementation of the dedicated bearer creation device may refer to that of the dedicated bearer creation method for the PDN gateway mentioned hereinabove, with a same technical effect.

It should be appreciated that, the functional members described in the specification are all referred to as modules/sub-modules/units, so as to emphasize the independence of the implementation thereof in a more particular manner.

In the embodiments of the present disclosure, the modules may be implemented by software, so as to be executed by various processors. For example, an identified, executable code module may include one or more physical or logical blocks including computer instructions, and the module may be constructed as an object, a process or a function. Even so, the executable codes of the identified modules are unnecessary to be physically located together, but may include different instructions stored in different locations. When these instructions are logically combined together, they may form the modules and achieve the prescribed purposes of the modules.

Actually, the executable code module may be a single instruction or a plurality of instructions, and may even be distributed at different code segments, in different programs, or across a plurality of memories. Also, operating data may be identified in the modules, implemented in any appropriate form, and organized in any data structure of an appropriate type. The operating data may be collected as a single data set, or distributed at different locations (including different memories), and may be at least partially present in a system or network merely as an electronic signal.

When the modules are implemented by software, considering the current hardware level, a person skilled in the art may build a corresponding hardware circuit to achieve the corresponding function when not taking the cost into consideration. The hardware circuit includes a conventional very-large-scale integration (VLSI) circuit, a gate array, an existing semiconductor such as a logic chip and a transistor, or other discrete components. The modules may further be implemented by a programmable hardware device, such as a field-programmable gate array, a programmable array logic device and a programmable logic device.

The above are the preferred embodiments of the present disclosure. It should be noted that, a person skilled in the art may further make improvements and modifications without departing from the principle of the present disclosure, and these improvements and modifications shall also be considered as the scope of the present disclosure.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A dedicated bearer creation method applied for a Mobility Management Entity (MME), comprising:
   keeping a control plane Non-Access Stratum (NAS) connection after a Tracking Area Update (TAU) procedure if it is determined that a User Equipment (UE) has moved from a first telecommunication network to a second telecommunication network based on identification information provided by the UE during the TAU procedure; and
   creating a dedicated bearer for the UE using the NAS connection if a create dedicated bearer request has been received from a Packet Data Network (PDN) gateway, wherein a TAU request message does not carry an active flag during the TAU procedure,
   wherein the creating the dedicated bearer for the UE using an existing NAS connection when the create dedicated bearer request has been received from the PDN gateway comprises:
   parsing, when a create session response has been received from a serving gateway and the create dedicated bearer request from the PDN gateway is carried in the create session response, the create dedicated bearer request from the create session response; and
   transmitting a request message to create dedicated bearer to the UE using the NAS connection based on the create dedicated bearer request.

2. The dedicated bearer creation method according to claim 1, wherein the keeping the control plane NAS connection after the TAU procedure comprises:
   keeping the control plane NAS connection within a preset time period after the TAU procedure; and
   releasing, when the create dedicated bearer request has not been received from the PDN gateway within the preset time period, the control plane NAS connection.

3. The dedicated bearer creation method according to claim 1, wherein the creating the dedicated bearer for the UE using the NAS connection when the create dedicated bearer request has been received from the PDN gateway comprises:
   transmitting, when the create dedicated bearer request has been received from the PDN gateway, the request message to create dedicated bearer to the UE using the NAS connection during or after the establishment of a user plane radio bearer for the UE.

4. The dedicated bearer creation method according to claim 3, wherein prior to or when transmitting the request message to create dedicated bearer to the UE using the NAS connection, the dedicated bearer creation method further comprises:
   transmitting an initial UE context setup request to the base station, so as to trigger the base station to create the user plane radio bearer for the UE.

5. The dedicated bearer creation method according to claim 1, wherein the identification information provided by the UE is a Globally Unique Temporary UE Identity (GUTI).

6. The dedicated bearer creation method according to claim 1, wherein the creating the dedicated bearer for the UE using the NAS connection when the create dedicated bearer request has been received from the PDN gateway comprises:
   transmitting, when the create dedicated bearer request has been received from the PDN gateway after the TAU procedure, the request message to create dedicated bearer to the UE using the kept NAS connection.

7. An MME, comprising a transceiver, a memory, a processor, and a computer program stored in the memory and executed by the processor, wherein the processor is configured to read the computer program stored in the memory so as to:
   keep a control plane Non-Access Stratum (NAS) connection after a Tracking Area Update (TAU) procedure if it is determined that a User Equipment (UE) has moved from a first telecommunication network to a second telecommunication network based on identification information provided by the UE during the TAU procedure; and create a dedicated bearer for the UE using the NAS connection if a create dedicated bearer request has been received from a Packet Data Network (PDN) gateway, wherein a TAU request message does not carry an active flag during the TAU procedure, wherein the processor is further configured to: when a create session response has been received from a serving gateway and the create dedicated bearer request from the PDN gateway is carried in the create session response, parse the create dedicated bearer request from the create session response; and transmit a request message to create dedicated bearer to the UE using the NAS connection based on the create dedicated bearer request.

8. The MME according to claim 7, wherein the processor is further configured to:

keep the control plane NAS connection within a preset time period after the TAU procedure; and when the create dedicated bearer request has not been received from the PDN gateway within the preset time period, release the control plane NAS connection.

9. The MME according to claim 7, wherein the processor is further configured to, when the create dedicated bearer request has been received from the PDN gateway, transmit the request message to create dedicated bearer to the UE using the NAS connection during or after the establishment of a user plane radio bearer for the UE.

10. The MME according to claim 9, wherein the processor is further configured to, prior to or when transmitting the request message to create dedicated bearer to the UE using the NAS connection, transmit an initial UE context setup request to the base station, so as to trigger the base station to create the user plane radio bearer for the UE.

11. The MME according to claim 7, wherein the identification information provided by the UE is a GUTI.

12. The MME according to claim 7, wherein the processor is further configured to, when the create dedicated bearer request has been received from the PDN gateway after the TAU procedure, transmit the request message to create dedicated bearer to the UE using the kept NAS connection.

* * * * *